United States Patent
Watkins

[15] 3,636,557
[45] Jan. 18, 1972

[54] ELECTROMAGNETIC INDICATOR HAVING OFFSET ROTOR MAGNET

[72] Inventor: John A. Watkins, Cheshire, Conn.
[73] Assignee: United-Carr Incorporated, Boston, Mass.
[22] Filed: Aug. 22, 1969
[21] Appl. No.: 852,211

[52] U.S. Cl. ..............................340/378, 310/46, 310/49, 310/156, 310/269, 335/272, 340/373
[51] Int. Cl. ..................G08b 5/14, H02k 37/00, H02k 1/24
[58] Field of Search ..........340/373, 378, 378 MW; 335/272; 310/46, 49, 156, 269

[56] References Cited

UNITED STATES PATENTS

| | | | |
|---|---|---|---|
| 3,260,871 | 7/1966 | Lang | 340/378 |
| 3,289,131 | 11/1966 | Watkins | 340/378 MW |
| 3,482,126 | 12/1969 | Bradley | 340/378 |

Primary Examiner—Robert L. Griffin
Assistant Examiner—Joseph A. Orsino, Jr.
Attorney—Louis Orenbuch

[57] ABSTRACT

An indicator is disclosed having a rotor which is able to turn promptly to 180° opposed positions to permit the successive display of diametrically opposed symbols carried on a drum. The position of the rotor's drum is governed by a stator that can establish any one of a number of differently oriented magnetic fields. The rotor has a permanent magnet which turns to align itself with the stator's magnetic field. By mounting the rotor to turn about a rotational axis so disposed that upon 180° reversal of the stator's magnetic field, the repelling field forces acting on the magnet do not pass through the rotational axis, the application of a turning force on the magnet is assured. The magnet is fashioned to cause its magnetic flux to be concentrated at two salient magnetic poles and is arranged to rotate about an axis offset from an straight line joining the salient poles.

4 Claims, 14 Drawing Figures

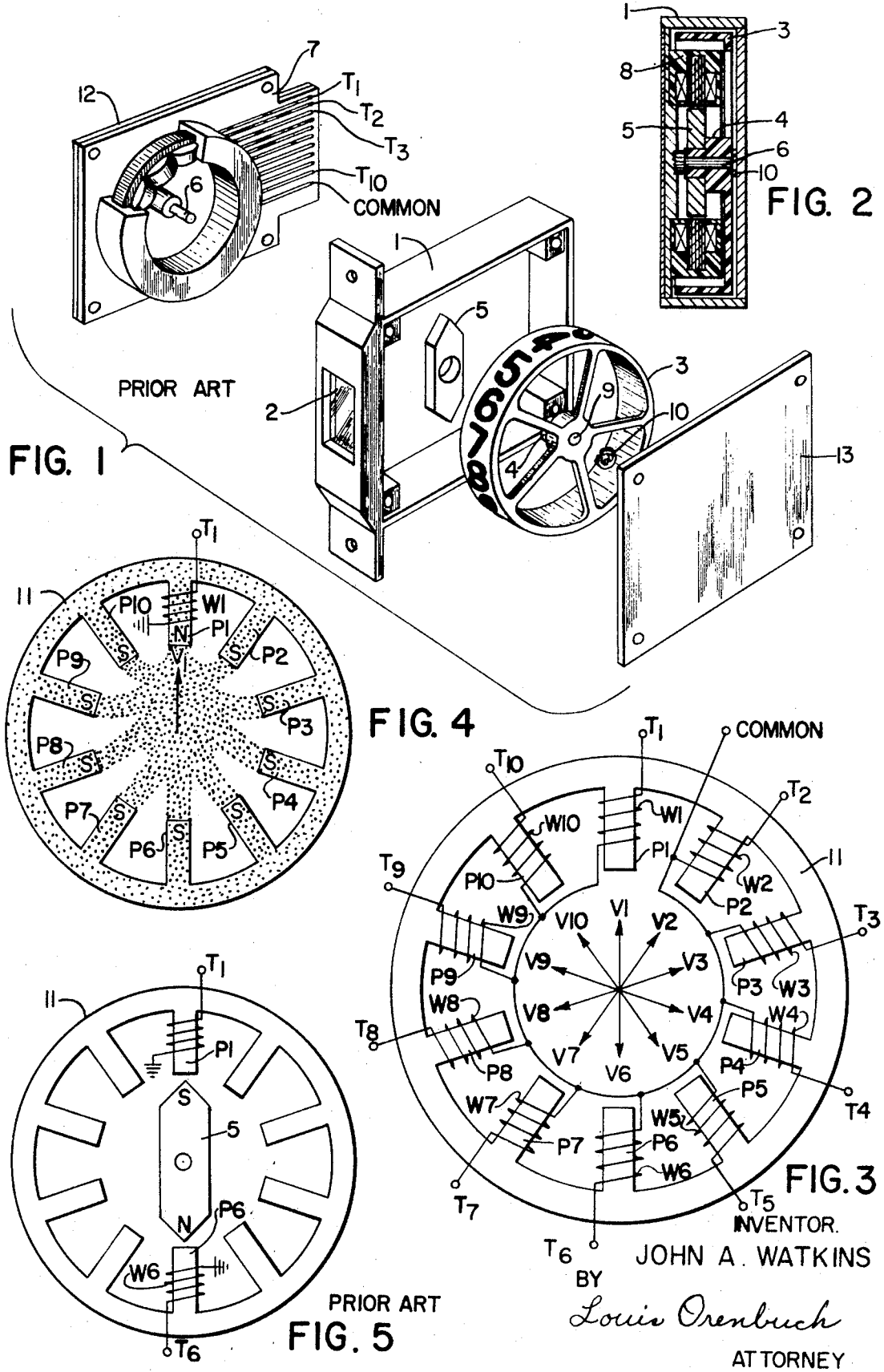

INVENTOR
JOHN A. WATKINS
BY Louis Orenbuch
ATTORNEY

INVENTOR
JOHN A. WATKINS
BY
*Louis Orenbuch*
ATTORNEY

ELECTROMAGNETIC INDICATOR HAVING OFFSET ROTOR MAGNET

FIELD OF THE INVENTION

This invention relates in general to indicators of the type having symbols marked upon the drum of a rotor that can turn to bring any of the symbols into a display station. MOre particularly, the invention pertains to indicators in which the orientation of the rotor is governed by an electromagnetic stator that can be energized by electrical signals to establish any one of a plurality of discretely oriented magnetic fields. The invention is concerned with indicators in which the rotor must be able to assume 180° opposed positions to permit diametrically opposed symbols on the drum to be displayed in succession. In such electromagnetic indicators, it is usual to employ symbols, such as arabic numerals or alphabetical characters, that are of uniform height. To permit the symbols to be of maximum size, the symbols are spaced at regular intervals around the drum's periphery and where there are an even number of symbols, each symbol is then diametrically opposite another symbol. That arrangement utilizes the peripheral surface area of the drum as fully as possible, but requires that the drum be capable of turning to a 180° opposite position where diametrically opposed symbols are to be displayed in succession. The invention insures the application of a turning force on the rotor whenever the rotor is required to assume a 180° opposite position.

DISCUSSION OF THE PRIOR ART

In electromagnetic indicators of the type here considered, the drum is part of a rotor having a permanent magnet and the orientation of the rotor is governed by the electromagnetic stator which is capable of establishing any one of a plurality of discretely oriented magnetic fields. For each symbol on the drum, there is a uniquely oriented magnetic field that can be established by the stator in response to electrical "command" signals. The establishment by the stator of a discretely oriented magnetic field constrains the rotor to turn and align its permanent magnet with the stator's magnetic field. The symbol-bearing drum is fixed to the permanent magnet and, when the magnet is aligned with the stator's field, a symbol is in register in the display station. Usually the display station is a window in a structure which permits only one drum symbol at a time to be visible in its entirety. The rotor, in prior art indicators, tends to "hang-up" when it is next required to display the diametrically opposite symbol. That is, the rotor initially tends to move sluggishly or not at all when it is commanded to turn to the 180° opposite position.

To avoid hang-up of the rotor, prior art indicators are provided with "offset" as taught by U.S. Pat. Nos. 2,943,313, 3,311,911, and 3,392,382. The use of "offset" requires that the permanent magnet first align itself with the stator's magnetic field and then move to an offset position when the stator's magnetic field decays upon cessation of the stator's energizing electrical signal. The use of "offset" is inherently effective in avoiding hang-up of the rotor in the "intermittent" mode of operation because the stator's magnetic field, in the interval between intermittent signals, collapses to permit the rotor to move to its offset position. In the intermittent mode of operation, the "comand" signals are electrical pulses which are applied to the stator for the interval needed to cause the rotor to move to its next station and the "command" signals are not present during the display interval. In continuous mode operation, the stator is almost continuously electrically energized as the termination of a subsisting signal is rapidly followed by another electrical signal. The use of "offset" is not effective in the continuous mode of operation unless sufficient time is alloted between successive signals to permit the rotor to move to its offset position in the interval between those signals. An indicator having "offset" is characterized by a "blink" of the symbol in the window. The blink occurs when the rotor turns from its field aligned position to its offset position. The "blink" of prior art indicators is an undesired characteristic. Efforts have been made to provide a nonblinking indicator in which the rotor does not hang-up when 180° rotation is required. For example, U.S. Pat. No. 3,419,858, discloses an indicator employing magnetizable pins on the rotor to assure a turning moment on the rotor.

OBJECTIVES OF THE INVENTION

This invention concerns electromagnetic indicators of the type having a rotor employing a symbol bearing drum whose position is magnetically governed and whose operation requires the rotor to assume, in succession, 180° opposite positions. The principal objective of the invention is to provide an indicator in which the presence of a turning force on the rotor is assured whenever the rotor is required to turn to a 180° opposite position. A further objective of the invention is to assure the presence of that turning force in a nonblinking indicator that can operate in both the intermittent and continuous modes.

THE DRAWINGS

The invention, both as to its construction and its manner of operation, can be better understood from the following exposition when it is considered in conjunction with the accompanying drawings in which:

FIG. 1 is an exploded view of a conventional electromagnetic indicator having a radial pole stator;

FIG. 2 is a cross-sectional view of the assembled FIG. 1 indicator;

FIG. 3 is a schematic representation of the radial pole stator in the FIG. 1 indicator;

FIG. 4 depicts the flux pattern of the magnetic field established by energizing a winding of the radial pole stator;

FIG. 5 illustrates the alignment of the rotor's permanent magnet with the field of the electrically energized radial pole stator;

Figure 6:
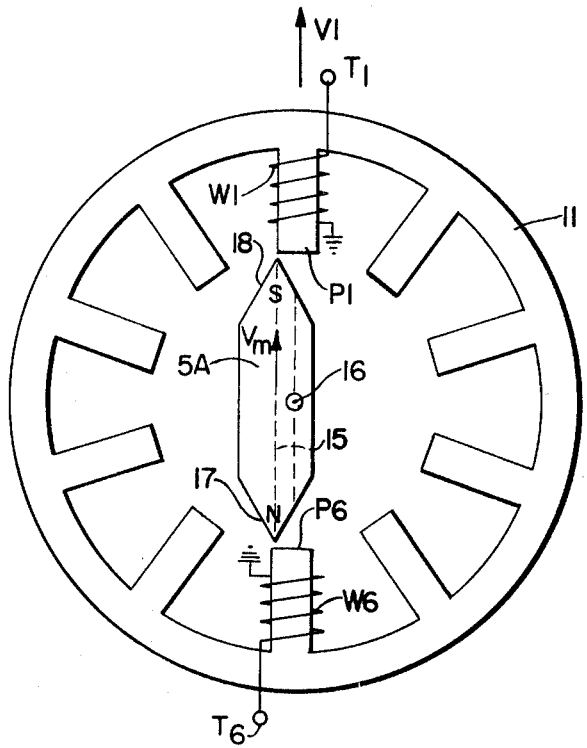
Figure 7:
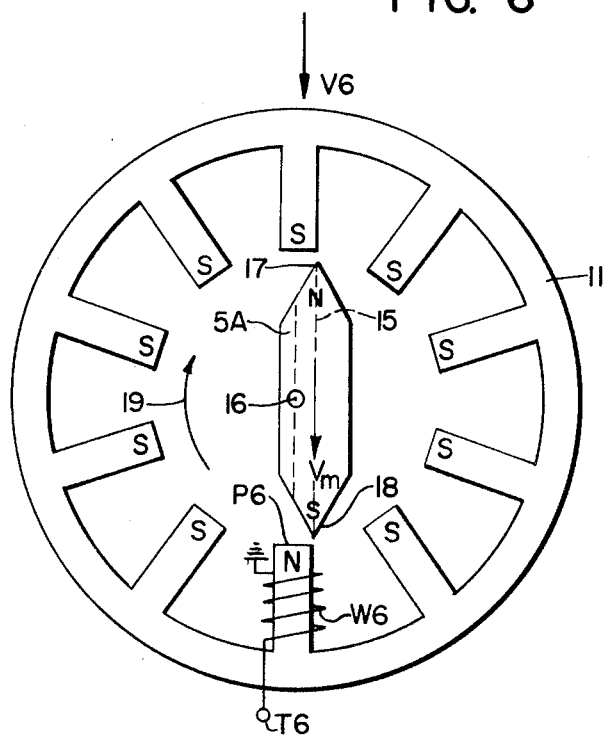
Figure 8:
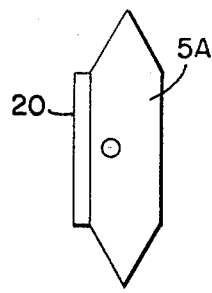
Figure 9:
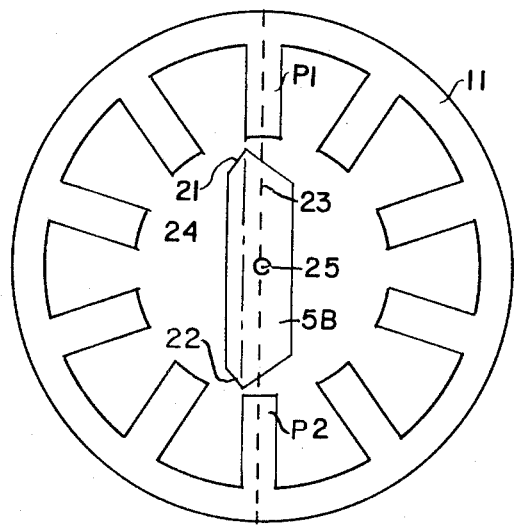
Figure 10:
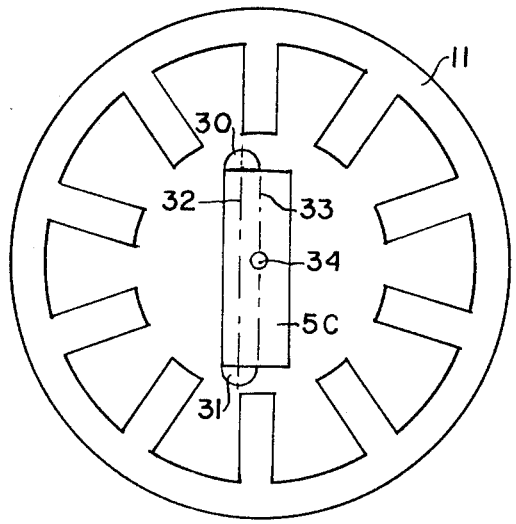
Figure 11:
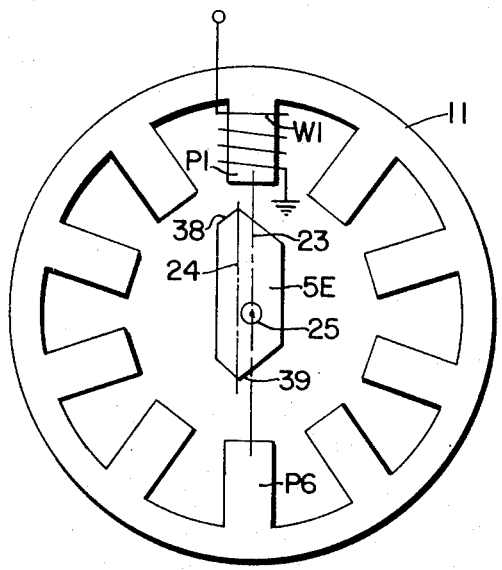
Figure 12:
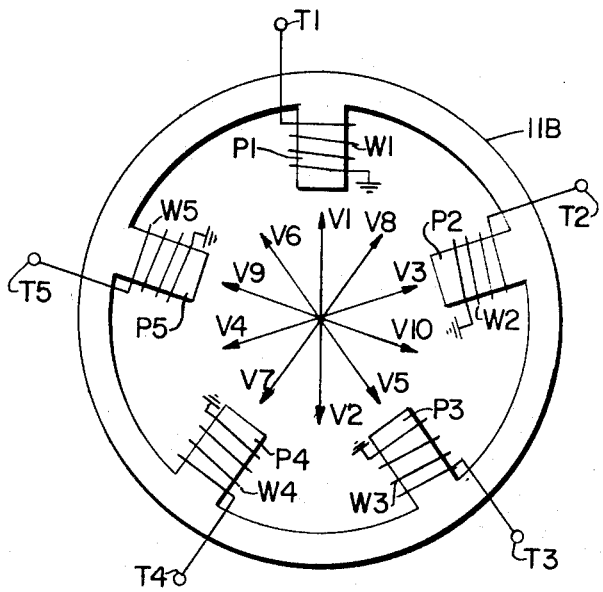

FIGS. 6 and 7 schematically depict an embodiment of the invention employing a permanent magnet whose rotational axis is offset from its magnetic axis;

FIG. 8 shows the addition of a balancing weight to the permanent magnet;

FIGS. 9 and 10 schematically depict embodiments of the invention employing a permanent magnet whose magnetic axis is offset from the longitudinal axis;

FIG. 11 depicts an embodiment of the invention employing an offset permanent magnet having a shortened end;

FIG. 12 shows a conventional stator of the type having five radial poles; and

Figure 13:
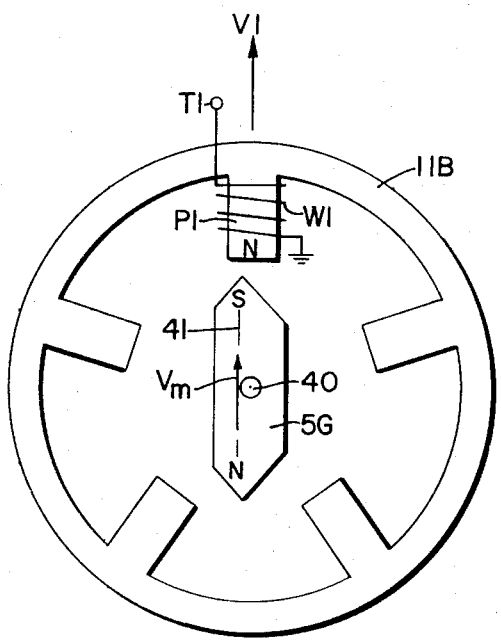
Figure 14:
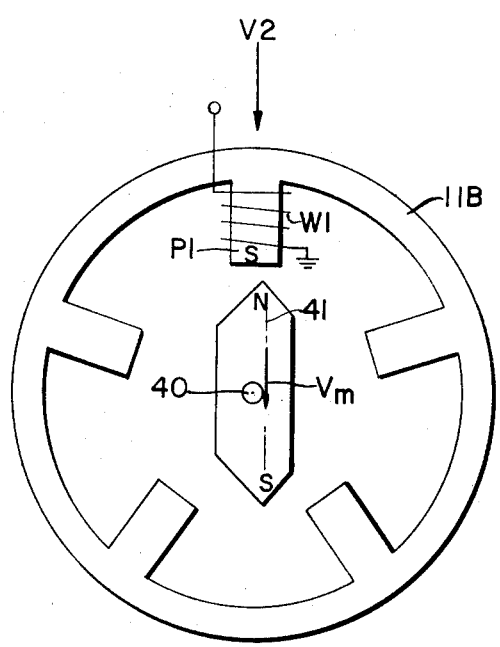

FIGS. 13 and 14 depict a variation of the invention using the conventional five-pole stator.

THE EXPOSITION

FIG. 1 depicts an indicator of conventional construction employing a housing 1 having a front panel containing a window 2 for displaying symbols marked upon the periphery of a drum 3. The drum has a hub 4 to which a permanent magnet 5 is secured, as shown in the sectional view of FIG. 2. The drum and permanent magnet comprise a rotor that is mounted to turn as a unit about a shaft 6. The shaft is secured to a board 7 and extends through the center of an annular stator 8. The hub 4 has a central bore 9 which permits the rotor to be mounted on the shaft. To retain the rotor so that it cannot slip off the shaft, a groove is provided near the shaft's end and the groove is engaged by a C-shaped lock member 10.

In the conventional indicator, the permanent magnet is symmetrical in shape because a symmetrical form tends to insure the balance of the rotor. That is, the rotor is usually finely balanced to turn freely upon the shaft and a symmetrical form conduces to that result. The permanent magnet may be of the bar shape shown in FIG. 1 or the magnet may have some other symmetrical shape such as oval or round. Whatever the form, in the conventional indicator, the magnetic poles of the permanent magnet are 180° apart with respect to the magnet's axis of rotation.

The stator 8, schematically depicted in FIG. 3, has an annular ferromagnetic core 11 from which 10 poles, P1, P2...P10 protrude radially inward. The core and radial poles are preferably blanked from a sheet of metal and a number of identical blanked forms are assembled in alignment to provide a core of the desired thickness. The poles are identical and are arranged symmetrically around the annulus so that each pole is diametrically opposite another pole. Each of the 10 poles is surrounded by its own winding, symbolically indicated in FIG. 3 by the windings W1, W2,...W10. ...W10. The windings are arranged to permit each of them to be separately energized by applying an electrical signal to it. Conventionally, each winding has one end connected to a COMMON line and the electrical signals applied at the input terminals T1, T2...T10 to the windings are all of the same polarity with respect to the COMMON potential.

The stator 8 has its core 11 and windings embedded in a matrix of a synthetic resin (viz, a "plastic" substance). In FIG. 1 a portion of the matrix is broken away to show the ferromagnetic core and some of the windings. The synthetic resin holds the windings fixed upon the radial poles and facilitates securing the stator to the board 7. In FIG. 3, the stator is shown without its plastic embedment.

The stator is secured to the board 7 which has electrical conductors to which windings W1, W2...W10 are connected. By applying an electrical signal to one of the terminals T1, T2...T10 and the COMMON terminal, a selected one of the windings can be electrically excited to establish a magnetic field.

As indicated in the sectional view of FIG. 2, the stator and rotor fit within the housing 1. In the assembled device, the drum 3 surrounds the annular stator 8 and the permanent magnet of the rotor is in the same plane as the radial poles of the stator. The sides of housing 1 are closed by end plates 12 and 13 which act as magnetic shields to prevent extraneous magnetic fields from interfering with the operating of the indicator. At the corners of the housing, posts are provided to receive the screws or other fastening devices which hold the end plates securely to the housing. In the assembled indicator, the circuit board 7 protrudes from the rear of the housing to permit access to terminals T1, T2...T10 and COMMON.

Assuming that winding W1 of the stator shown in FIG. 4 is electrically energized to cause pole P1 to be a North magnetic pole, all the other poles become South magnetic poles. The flux pattern of the magnetic field established by the energized winding is indicated by the stippling in FIG. 4. The magnetic field is represented in that figure by the vector V1 whose direction is toward the North magnetic pole and whose length is a measure of the magnetic field intensity. The line of action of vector V1, it should be observed, extends through the geometric center of the annular core 11 and centrally through pole P1. Permanent magnet 5 which is within the magnetic field, rotates about shaft 6 into alignment with the vector V1 and assumes the position depicted in FIG. 5 where the South pole of the permanent magnet is adjacent to pole P1 and the other pole of the permanent magnet is adjacent to pole P6. With the magnet aligned, as indicated in FIG. 5, with the vector V1, one of the symbols on the drum is positioned in the window 2 of the housing.

By separately energizing each of the stator windings, 10 discretely oriented magnetic field vectors V1, V2,...V10 can be established as indicated in FIG. 3 and thereby any one of 10 symbols on the drum can be brought into display position in the window of the housing. Each symbol on the drum is of such size that it completely fills the window so that only one symbol can be in registration with the window at any time. For the purpose of exposition, the symbols are assumed to be the arabic numerals 0, 1, 2,...9 and it is assumed that the display of numeral 1 is governed by the vector V1, the display of numeral 2 is governed by vector V2, the display of numeral 3 is governed by vector V3, and so on. It is evident from FIG. 3 that each of the vectors has its line of action extending through the geometric center of the annular core and that each vector is in line with a vector extending in the 180° opposite direction. Because of that vectorial arrangement, the numerals on the drum are disposed so that each numeral is diametrically opposite to another numeral on the drum.

Assuming the permanent magnet has rotated into alignment with poles P1 and P6, as indicated in FIG. 5, and that the electrical excitation of winding W1 ends, the magnetic field established by the stator collapses. The rotor, however, retains its aligned position because of the attractive force between the poles of the permanent magnet and the adjacent radial poles P1 and P6 of the stator. The indicator, in essence, then has a "memory" because the rotor remains in position after the input signal to the stator has ended and retains that position until the rotor is commanded to take another position by energizing a different winding on the stator. In the interval between the application of "command" signals, the stator is electrically unenergized. That mode of operation is the intermittent mode.

In the continuous mode of operation, an electrical signal is applied to winding W1, for example during the entire period that the numeral 1 is to be displayed. When another symbol is to be displayed, the electrical signal to winding W1 is immediately succeeded by the application of an electrical signal of the same polarity to some other winding of the stator. For example, where the display of numeral 1 is to be succeeded by the display of the numeral 6, the signal applied to winding W1 is terminated and the winding W6 is then energized by an electrical signal applied at terminal T6. The rotor which was originally aligned as indicated in FIG. 5, must then turn through 180° to align itself with the V6 vector. In the conventional indicator, there is no turning moment present to cause the rotor to turn because the resultant force acting on the permanent magnet is directed through the rotor's axis of rotation. That is, the forces of repulsion exerted on the permanent magnet's poles when winding W6 is electrically energized, are directed through the axis of rotation so that no unbalanced couple arises. The rotor, consequently, tends to remain in position (viz, tends to "hang-up") and its initial turning motion, if it turns at all, is sluggish. Where consistently rapid operation of the indicator is desired, the tendency of the rotor to hang-up when it is commanded to turn to a 180° opposite position is a disadvantage in conventional indicators which is present in both modes of operation.

FIG. 6 schematically depicts an embodiment of the invention that is an improvement upon the previously described conventional indicator. The rotational axis 16, in the FIG. 6 embodiment, is at the geometric center of the annular ferromagnetic core 11 and therefore is coincident with the post 6. The permanent magnet 5A of the rotor is constructed so that its magnetic axis 15 is displaced from the rotational axis 16 about which the magnet turns. Magnet 5A is in the form of a bar having wedge-shaped ends 17 and 18 at which are located the North and South magnetic poles. Those ends constitute "salient" magnetic poles in the sense that the magnetic flux is concentrated at points which sharply define the North and South magnetic poles. The magnetic axis of the magnet is assumed to be a straight line passing through the North and South magnetic poles. The magnet 5A is symmetrical with respect to its magnetic axis 15 and the field of that magnet can be represented by a vector $V_m$ whose line of action is along the magnetic axis as indicated in FIG. 6.

Assuming winding W1 is electrically energized to cause the stator to establish the magnetic field of vector V1, permanent magnet 5A takes the position indicated in FIG. 6 where its vector $V_m$ is parallel to the vector V1. In that position, the magnet's salient poles 17 and 18 are adjacent to the radial poles P1 and P6 but are offset from the diametrical line passing centrally through the radial poles. Where the electrical signal to winding W1 is terminated and no other signals are applied to the stator windings, the permanent magnet 5A remains in the FIG. 6 position because of the attractive forces that the magnet's poles exert upon adjacent radial poles P1 and P6.

Where winding W6 is next energized, pole P6 becomes a North magnetic pole whereas pole P1 and all the other radial poles become South magnetic poles as indicated in FIG. 7. The force of repulsion between pole P6 and the North pole 17 of magnet 5A exceeds the repulsive force between pole P1 and the magnet's South pole 18 and consequently an unbalanced couple exists which turns the magnet in the direction indicated by arrow 19. Those forces of repulsion, in contrast to the FIG. 5 device, are not directed through the pivotal axis 16 of the FIG. 6 embodiment. Permanent magnet 5A promptly turns to the 180° opposite position where its vector $V_m$ is parallel to the vector V6 of the stator's magnetic field. The FIG. 6 embodiment of the invention assures the presence of a turning force on the permanent magnet whenever the rotor is required to turn to a 180° opposite position.

In the FIG. 6 embodiment, the rotational axis 16 is disposed at the center of the annular ferromagnetic core but that axis is eccentric with respect to the magnet 5A. Because the magnet 5A is a symmetrical structure that is eccentrically mounted, the rotor is unbalanced. To bring the rotor into balance, a weight 20 of nonmagnetic material can be added as indicated in FIG. 8. In the continuous mode of operation, some unbalance of the rotor can be tolerated since the stator's magnetic field can be relied on to hold the permanent magnet in the field aligned position. In the intermittent mode of operation, when the stator is electrically unenergized, the detenting force which holds the rotor in its "aligned" position is provided by the field of the permanent magnet. Where the unbalance of the magnet 5A is uncompensated by a balancing weight, the field of the magnet may not be strong enough to hold the rotor stationary where the indicator is subjected to shock or vibration. In that circumstance, a shift in position of the rotor can occur which would cause the displayed symbol to be inaccurately registered in the window. Therefore, for indicators where the intermittent mode of operation is contemplated, it is best to employ a balanced permanent magnet.

FIG. 9 depicts an embodiment of the invention having a bar-shaped permanent magnet 5B whose wedge-shaped ends 21, 22 are equally offset from the magnet's longitudinal axis 23. In this instance, the longitudinal axis is the line running in the lengthwise direction of the bar which splits the bar into two parts of equal weight. The North and South poles are at the tips of the wedge-shaped ends whereby the magnetic axis 24 of the permanent magnet is parallel to but displaced from the longitudinal axis. Permanent magnet 5B is mounted to turn about the rotational axis 25 which is at the geometric center of annular core 11. Preferably, the magnet is mounted to cause its longitudinal axis 23 to run through the rotational axis so that the magnet is in balance and need not be compensated by a balancing weight.

FIG. 10 depicts a bar magnet 5C of conventional configuration to whose ends soft iron pole pieces 30, 31 are secured to concentrate the magnetic flux so as to constitute "salient" magnetic poles. The soft iron pieces 30,31, distort the magnetic field of the permanent magnet in a manner causing the magnetic axis 32 to be parallel to and displaced from the magnet's longitudinal axis 33. The magnet 5C is mounted to rotate about an axis 34 which is not on the magnetic axis 32 and from which the poles are equidistant. Functionally, the magnet of FIG. 10 is the equivalent of the FIG. 9 magnet.

In the embodiments of the invention thus far described, the permanent magnets 5A to 5D are depicted as having their salient poles equidistant from the rotational axis. The permanent magnet may, as shown by the permanent magnet 5E in FIG. 11, have one end shortened. The magnet 5E aligns itself with the field vector established by the electrically energized stator in the same manner as the permanent magnet 5B of FIG. 9. However, as the tip 38 of the magnet 5E is closer to pole P1 than is the tip 39 to pole P6, if the signal to winding W1 is terminated and no other winding is energized, the attractive force between pole P1 and tip 38 of magnet 5E tends to cause the permanent magnet to shift its position and cause the indicator to blink. In the continuous mode of operation, no blink is evident as the termination of the signal to one winding is immediately followed by the energization of another winding. The permanent magnet 5E as is evident, is a variation upon the magnet 5B of FIG. 9. The advantage of the FIG. 11 embodiment resides in its quicker response when the rotor is required to turn to a 180° opposite station.

In the embodiments of the invention thus far described, the stator is of the type having diametrically opposed radial poles protruding inwardly from the annular core and it was assumed that the electrical signals applied to the windings were all of the same polarity with respect to the COMMON potential. Thus the radial pole carrying the energized winding was, in the assumed example, always a North magnetic pole. FIG. 12 depicts a conventional stator of the type in which an annular core 11B has five inwardly protruding radial poles uniformly spaced around the core. Each radial pole carries a winding W1, W2...W5 which can be separately energized by an electrical signal applied at one of the terminals T1, T2...or T5. By using signals that can be of either electrical polarity with respect to the COMMON (ground) potential, 10 magnetic fields can be established whose directions are represented by the vectors V1 to V10. The odd numbered magnetic field vectors V1, V3...or V9 is established when the radial pole carrying the energized winding is a North magnetic and the even numbered magnetic field vector V2, V4 etc., is established when the energized winding causes pole P1 to be North magnetic, the magnetic field established by the stator is represented by vector V1. Upon altering the polarity of the electrical signal at terminal T1, the current flow in winding W1 causes pole P1 to become South magnetic and the field established by the stator is then represented by vector V2.

FIGS. 13 and 14 schematically depict an embodiment of the invention employing the FIG. 12 "reverse polarity" radial pole stator. In FIG. 13 it is assumed that the winding W1 is electrically energized by a signal at terminal T1 which causes pole P1 to be North magnetic. Permanent magnet 5G is mounted to rotate about the axis 40 which is at the geometric center of the annular core 11B. The magnetic axis 41 of magnet 5G is offset from the rotational axis 40. The permanent magnet, under the influence of the magnetic field established by the stator, turns until its vector $V_m$ is parallel to the vector V1. In that station, one of the symbols on the drum is fully displayed in the window of the indicator. If the signal at terminal T1 is then changed in electrical polarity, pole P1 becomes South magnetic and the 180° opposite field represented by vector V2 is established. The South magnetic pole of magnet 5G is repelled by pole P1 and the permanent magnet rotates about its axis to assume the station depicted in FIG. 14 where the magnet's vector $V_m$ is parallel to vector V2. In that station, another symbol on the drum is fully displayed in the indicator's window.

The permanent magnet used in the invention can be of shapes other than the rectangular form depicted in the drawings. The permanent magnet may, for example, be round or oval. The essence of the invention resides in mounting the permanent magnet so that it can turn about a rotational axis to bring its magnetic axis into parallel alignment with the magnetic fields established by the stator and disposing the rotational axis so that upon 180° reversal of the stator's magnetic field, the lines of action of the forces acting on the magnet do not pass through the rotational axis. By that arrangement, the presence of a turning force on the magnet is assured whenever 180° oppositely directed magnetic fields are established in succession by the stator. The South magnetic pole of magnet 5G is repelled by pole P1 and the permanent magnet rotates about its axis to assume the station depicted in FIG. 14 where the magnet's vector $V_m$ is parallel to vector V2. In that station, another symbol on the drum is fully displayed in the indicator's window.

The permanent magnet used in the invention can be of shapes other than the rectangular form depicted in the drawings. The permanent magnet may, for example, be round or oval. The essence of the invention resides in mounting the permanent magnet so that it can turn about a rotational axis to bring its magnetic axis into parallel alignment with the magnetic fields established by the stator and disposing the rotational axis so that upon 180° reversal of the stator's magnetic field, the lines of action of the forces acting on the magnet do not pass through the rotational axis. By that arrangement, the presence of a turning force on the magnet is assured whenever 180° oppositely directed magnetic fields are established in succession by the stator.

I claim:

1. In an electromagnetic indicator of the type utilizing a stator having an annular ferromagnetic core from which poles protrude radially inwardly, the poles having windings which are selectively energizable by electrical signals to establish any one of a plurality of discretely oriented magnetic fields, at least some of the magnetic fields being oriented in 180° opposite directions, and a rotor having a magnet fixed to a drum, the rotor being mounted to permit the magnet to turn about an axis at the geometric center of the annular core under the influence of a discretely oriented magnetic field established by the stator, the improvement for assuring the presence of a turning force on the magnet whenever 180° opposite magnetic fields are established in succession by the stator, the improvement residing in the magnet having salient north and south poles disposed 180° apart on the magnet's longitudinal axis, the magnet being symmetrical about its longitudinal axis, and the longitudinal axis of the rotor being offset from the magnet's axis of rotation.

2. The improved electromagnetic indicator according to claim 1, wherein the radial poles of the annular core are situated so that each radial pole is diametrically opposite another radial pole, the improvement being further characterized in that the salient north and south poles of the magnet are equidistant from the magnet's rotational axis.

3. In an electromagnetic indicator of the type utilizing a stator having an annular ferromagnetic core carrying windings which are selectively energizable by electrical signals to establish any one of a plurality of discretely oriented magnetic fields, each discretely oriented magnetic field having a vector directed through the geometric center of the annular core, at least some of the magnetic fields being oriented in 180° opposite directions, and a rotor having a magnet attached to a drum, the rotor being mounted to permit the magnet to rotate about an axis at the geometric center of the annular core under the influence of a discretely oriented magnetic field established by the stator, the improvement for assuring the presence of a turning force on the magnet whenever 180° opposite magnetic fields are established in succession by the stator, the improvement residing in the magnet having salient north and south poles located such that when the magnet has rotated into alignment with the stator established field, the salient north and south poles of the magnet are on the same side of and equally offset from a diametral line identical in direction with the vector of the stator established field.

4. The improved electromagnetic indicator according to claim 3, wherein the stator is of the type having poles protruding radially inwardly from the annular ferromagnetic core, the radial poles being spaced around the annular core whereby each radial pole is diametrically opposite another radial pole, the improvement being further characterized in that the salient north and south poles of the magnet are spaced from the magnet's rotational axis to cause those poles to be equidistant from the nearest radial pole when the magnet is aligned with a stator established field.

* * * * *